PREFORM LOADER

Filed June 23, 1969

INVENTOR.
ALFRED R. KROEHS
BY
Popper, Bain & Bobis
ATTORNEYS

United States Patent Office 3,616,510

Patented Nov. 2, 1971

3,616,510

PREFORM LOADER

Alfred R. Kroehs, Belford, N.J., assignor to Alpha Metals, Inc., Jersey City, N.J.

Filed June 23, 1969, Ser. No. 835,676

Int. Cl. H05k *13/04*; B23g *7/10*

U.S. Cl. 29—203 B 3 Claims

ABSTRACT OF THE DISCLOSURE

A preform loader wherein contact pins to be connected to a circuit board are moved through a slot in a channel containing preforms, and in so doing, each pin picks off a preform by entering a hole in the preform and sliding it out of the channel, overcoming a deflectable detent at the end of the channel.

BACKGROUND OF THE INVENTION

Field of invention

This invention relates to solder preform loaders generally and specifically to automatic means for placing a solder preform on a pin or lead, for soldering the pin or lead to an electronic device such as a flat pack, integrated circuit, printed circuit or the like.

Prior art

Contact pins, sometimes called wire wrap pins, are caused to be inserted through holes in the top of electronic devices and printed circuits or the like. If the hole is a plated through hole, the pin is to be soldered to the plated through hole. To manually place a solder preform of minute size over the contact pin, also of very minute size, is a tedious task. Besides tedium, it is time consuming, and labor costs may vastly increase the cost of the electronic part.

SUMMARY OF INVENTION

It has been found that solder preforms may be automatically loaded on contact pins in the manner in which rings are snared by riders on a merry-go-round. The solder preforms are caused to perform a random dance in a hopper until they enter by means of vibration successively into a preform channel. The channel has a bottom pin-slot through which the contact pins are guided, so that the upper end of the pins enter the hole of a preform, and pick it out of the preform channel past a detent, just like the brass ring is snared by the merry-go-round rider. In this manner, solder preforms are loaded on contact pins automatically, with great speed and economy.

The drawings:

These objects and advantages as well as other objects and advantages may be attained by the device shown by way of illustration in the drawings in which FIG. 1 is a view in perspective of an ordinary connector frame with connectors carrying connecting pins passed through the frame;

PREFERRED EMBODIMENT

Figure 1:
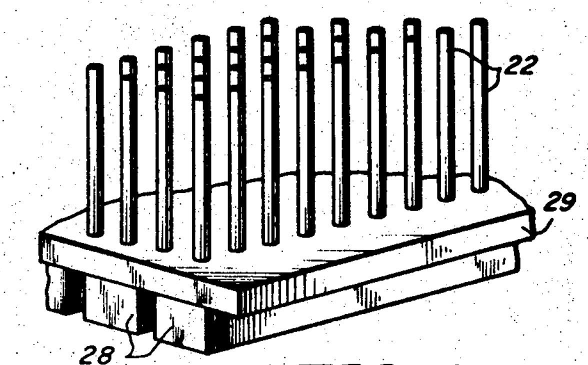
Figure 2:
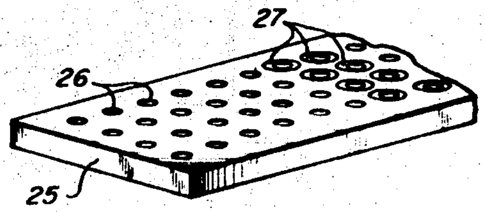
FIG. 2 is a view in perspective of a printed circuit board having some plated through holes for connection to contact pins.

Referring now to the drawings in detail, the preform loader provides a base 11. A bracket 12 is mounted on the base and supports a vibrator 13. A plate or table 14 is connected to the bracket 12, so that it is kept in a constant state of agitation. On the top of the plate 14, a downslanted cavity is provided, defining a hopper 16 for holding solder preforms 17. These preforms 17 are ordinarily circular in shape with a central hole, although they may be provided in other shapes with a central hole. A preform track 18 communicates from the bottom of the hopper 16 with the lower edge of the table 14. The track 18 is covered by a resilient, thin metal strip 19, terminating in a downturned end defining a detent 20 which holds the bottom preform 17 in the track 18. A transparent cover 10 for the hopper 16 is provided. The detent 20 is deflectable under pressure, to release a preform 17, and having been so deflected, springs back to hold the next succeeding preform 17. The detent 20 normally holds the lowest preform in the track until pressure exerted on the preform 17 deflects the detent 20. The preform track 18 has a bottom pin-slot 21 at its lower end, positioned in the center of the floor of the track and dimensioned to receive a contact pin 22.

This preform loader constitutes the invention which operates on connector pins 22. A circuit board 25 having a plurality of components is prepared. The circuit board 25 has a number of dummy holes 26 which are not required or prepared for external connection. There are also provided, a number of plated-through holes 27, which are to be connected to contact pins 22.

Figures 3, 4, 5, 6:
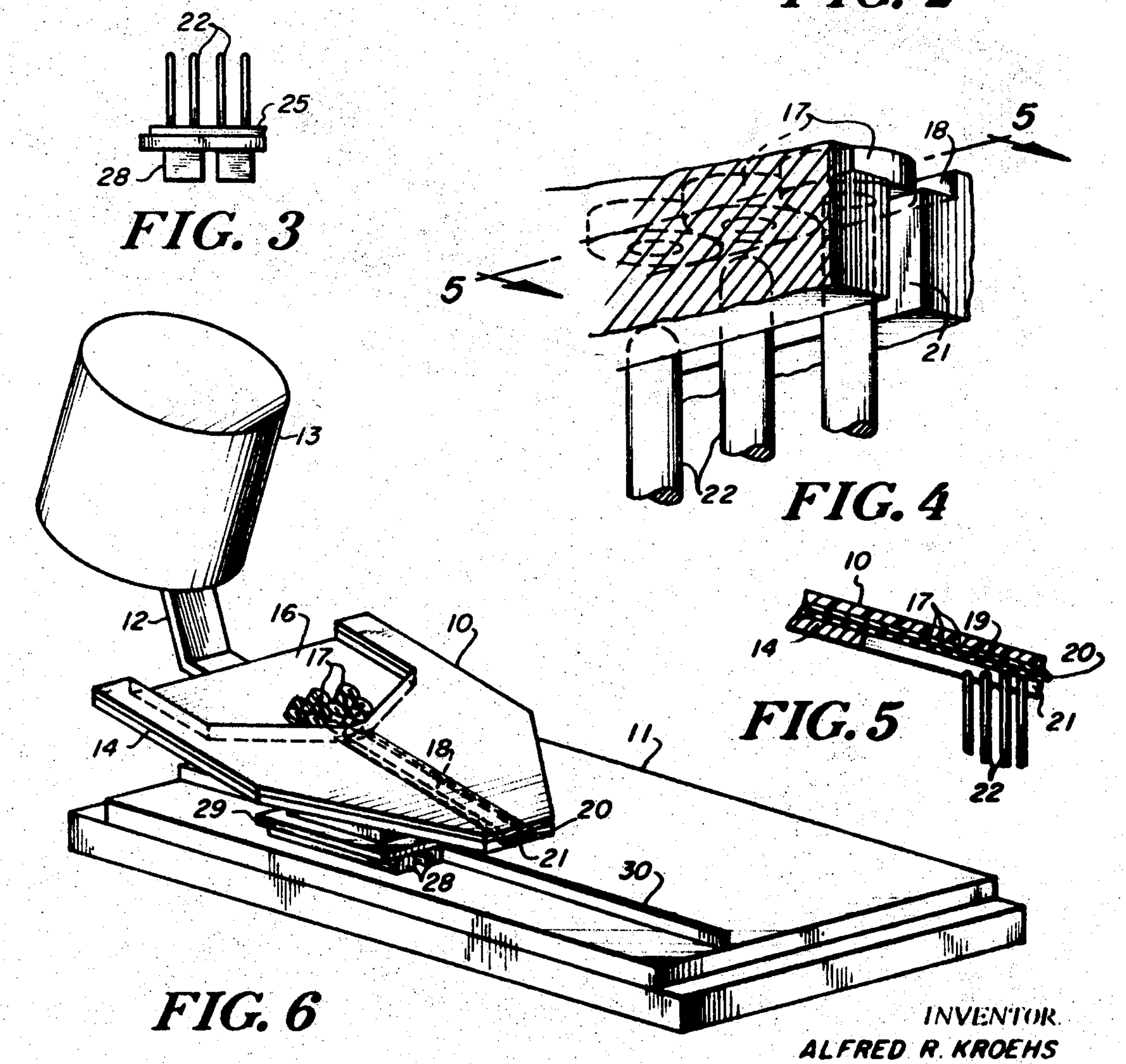
FIG. 3 is a partial end elevational view of a connector frame assembly with the pins passed through a printed circuit board.
FIG. 4 is a perspective view of the end of the preform track with a pin picking off a preform.
FIG. 5 is a vertical sectional view of the preform track, taken on the line 5—5 in FIG. 4, looking in the direction of the arrows.
FIG. 6 is a perspective view of the preform loader.

An elongated conductive strip or connector 28 is the mounting for the pins 22, which are passed through a connector frame 29. The circuit board 25 is then positioned so that the contact pins 22 are passed through the holes 26, 27. Connector frames 29 have mostly two or more connectors 28. A guide rail 30 is located on the base 11, extending from the rear to the front of the base. When a pair of connectors 28 are positioned to straddle the guide rail 30, the pins 22 are in alignment with pin slot 21. Since the preform track 18 is angled downwardly, the path traversed by the pins 22 will bring them through the pin slot 21 as will be seen in FIG. 4. The pins 22 will thus pass into the hole in a solder preform 17, and will pick it out of the preform track 18 by moving the preform 17 until it overcomes the resilient detent 20 and is released from the preform track 18. The preform then drops down the pin 22 until it lies over the plated-through hole 27. The pin 22 and the plated-through hole 27 are then soldered together by melting the preform. The preform loader avoids the tedious dropping of preforms 17 by hand onto the pins 22, by automatically picking off a preform 17 as the pins ride through the slot 21.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

I claim:

1. A preform loader for automatically capturing a solder preform on a contact pin of a circuit board comprising, (a) a slanted track, sufficiently wide to accept a solder preform, (b) a solder preform hopper wider than the track, communicating with the upper end of the slanted track, (c) a vibrator attached to the solder preform hopper, whereby the solder preforms in the hopper are agitated to move into and down the track to the lower end thereof, (d) a slot in the middle of the track, extending upwardly from the low end of the track, positioned to be in general registration with a central orifice in solder preforms in the track, (e) a strip covering the track to retain the solder preforms therein, (f) a deflectable detent on the end of the strip, blocking the discharge of solder preforms out of the low end of track, (g) a guide rail for a workpiece positioned in spaced relation to the low end of the track, to guide the workpiece under the track, with the contact pins on the workpiece positioned to pass through the slot in the track and to engage the contact pins on the workpiece successively with the holes in successive preforms and to move them to overcome the deflectable detent to release each solder preform from the track and capture them on a pin.

2. A preform loader comprising (a) a slanted track, (b) means to deliver preforms into the track, (c) a slot in the middle of the track, extending to the lower end thereof, (d) a deflectable detent blocking the discharge of preforms from the lower end of the track, (e) means to guide pins through the slot at a height sufficient to engage the top of a pin with a hole in a preform at the bottom of the track and to drive the preform out of the track, overcoming the detent, (f) said means to guide pins through the slot is a guide rail positioned in spaced relation to the slot and dimensioned to slidably receive a portion of a circuit board assembly having contact pins thereon.

3. The device according to claim 2 in which the track is a channeled body having an elongated passage sufficiently wide to slidably receive only a single preform, and sufficiently long to receive at least one preform.

References Cited

UNITED STATES PATENTS

| | | | |
|---|---|---|---|
| 3,095,344 | 6/1963 | Sandow | 29—211 X |
| 3,209,441 | 10/1965 | Ducharme et al. | 29—203 |
| 3,377,688 | 4/1968 | Beumer | 29—203 |

OTHER REFERENCES

Kurbaba, M. R., "Solder Ring Applicator," IBM Technical Disclosure Bulletin, vol. 11, No. 11, April 1969.

ANDREW R. JUHASZ, Primary Examiner

J. F. COAN, Assistant Examiner

U.S. Cl. X.R.

29—203 P, 211 R